United States Patent [19]
Nakata

[11] Patent Number: 5,476,563
[45] Date of Patent: Dec. 19, 1995

[54] PROCESS OF MAKING A DOOR MAT

[75] Inventor: Akira Nakata, Komaki, Japan

[73] Assignee: Yugengaisya Towa, Aichi, Japan

[21] Appl. No.: 257,140

[22] Filed: Jun. 9, 1994

Related U.S. Application Data

[62] Division of Ser. No. 932,496, Aug. 24, 1992, Pat. No. 5,346,757.

[30] Foreign Application Priority Data

Feb. 7, 1992 [JP] Japan .................................. 4-57065
Jun. 2, 1992 [JP] Japan .................................. 4-168399

[51] Int. Cl.⁶ .................................................. D04H 3/16
[52] U.S. Cl. .................... 156/167; 156/209; 156/244.24; 264/103; 264/178 F; 264/284
[58] Field of Search ........................ 264/103, 178 F, 264/210.2, 211.12, 284; 156/167, 209, 244.11, 244.24

[56] References Cited

U.S. PATENT DOCUMENTS

| Re. 31,599 | 6/1984 | Rasen et al. ........................... | 156/167 |
|---|---|---|---|
| 3,666,608 | 5/1972 | Mattes ........................................ | 428/95 |
| 3,687,796 | 8/1972 | Stumpf ...................................... | 428/95 |
| 3,709,768 | 1/1973 | Stumpf ...................................... | 428/95 |
| 3,837,988 | 9/1974 | Hennen ..................................... | 428/95 |
| 3,852,152 | 12/1974 | Werner .................................... | 428/371 |
| 3,936,337 | 2/1976 | Stapp ........................................ | 428/371 |
| 4,342,802 | 8/1982 | Pickens .................................... | 428/95 |
| 4,351,683 | 9/1982 | Kusilek .................................... | 428/371 |
| 4,645,699 | 2/1987 | Neveu ...................................... | 428/95 |
| 4,849,271 | 7/1989 | Weihrauch ............................... | 428/88 |
| 4,859,516 | 8/1989 | Yamanaka ................................ | 428/95 |

FOREIGN PATENT DOCUMENTS

| 3149820 | 6/1983 | Germany ................................ | 428/88 |
|---|---|---|---|
| 1224451 | 3/1971 | United Kingdom ............... | 264/178 F |

Primary Examiner—Leo B. Tentoni
Attorney, Agent, or Firm—Lowe, Price, LeBlanc & Becker

[57] ABSTRACT

A method for making a door mat comprising an integral mass of loops of synthetic resin monofilaments which includes a surface layer having a decorative pattern on its upper side and a reverse surface layer having its upper side joined to the lower side of said surface layer. The underside of the reverse surface layer may be joined to an anti-slip layer, which may be in the form of a lattice layer.

4 Claims, 6 Drawing Sheets

PROCESS OF MAKING A DOOR MAT

This application is a division of application Ser. No. 07/932,496 filed Aug. 24, 1992, now U.S. Pat. No. 5,346,757, and the benefits of 35 USC 120 are claimed relative to it.

BACKGROUND OF THE INVENTION

Heretofore, a variety of products were available provided with an anti-slip mechanism produced by laminating a netlike sheet on the floor contacting surface of a carpet or mat, or produced by adhering coillike continuous fiber in a random manner on the floor contacting surface of a carpet or mat. However, such anti-slip mechanisms were applied to a preformed carpet or mat in a secondary manner so that the production and fabrication processes became complicated and took longer time to make. Furthermore, both materials and apparatus for adhesion or heating were necessary, which increased the costs. The resulting products were not always satisfactory from the standpoint of durability.

Also, the pattern provided on the surface of the carpet or mat was applied by knitting, embroidery, dyeing or paint, but this required technology of a high degree and a long manufacturing time. This resulted in expensive products which were not always suitable for door mats, and there were problems such as peeling of the paint and the like.

In use door mats are easy to move and it is necessary to provide them with an anti-slip mechanism. Also, since they are often installed at the entrance of a building good appearance and decorative effects are desirable. However, the prior door mats constructed of looped synthetic resin monofilaments have not been provided with an anti-slip mechanism. Also, such door mats were not provided with a pattern so that they were extremely unattractive and poor in appearance.

SUMMARY OF THE INVENTION

This invention relates to door mats and to a method for the manufacture of door mats. In particular it relates to a method in which a molding roll containing concave grooves on its peripheral surface, and a pattern forming roll with convex stripes on its peripheral surface are disposed in opposition to each other, and a large number of synthetic resin monofilaments are extruded and some of the filaments accumulate in loop form in the concave grooves of the molding roll to form an anti-slip layer, and other monofilaments are deposited in loop form both on the surface of the anti-slip layer and the molding roll to thereby form a reverse surface layer, and still other filaments are deposited on the water surface lower than the surface of the molding roll to form a surface layer in loop form on the reverse surface layer, and the anti-slip layer is provided on the reverse surface layer of the mat by forming the decoration pattern by the convex stripes pattern on the pattern forming roll, and a design or decoration pattern is integrally formed on the surface layer.

An object of this invention is to provide a door mat that has a surface layer and a reverse surface layer formed by a large number of looped synthetic resin monofilaments, and each layer thereof is mutually fused and bonded at the intersections of the loops.

Another object of this invention is to provide a door mat that has a surface layer with a large number of looped synthetic resin monofilaments and to form a reverse surface layer on the undersurface of the surface layer, and moreover, provide an anti-slip layer on the undersurface of the reverse surface layer, and to provide a method of manufacturing such door mats.

A further object of this invention is to provide a door mat in which a design pattern is provided on the surface layer of the door mat.

A further object of this invention is to provide a door mat that provides a molding roll having a design pattern of convex stripes on its peripheral surface in order to provide a design pattern on the surface layer of the door mat formed by a large number of looped synthetic resin monofilaments, and to provide a method of manufacturing such door mats.

A still further object of this invention is to provide a pattern forming roll provided with convex stripes on its peripheral surface in order to provide a design pattern on the surface layer of the door mat.

DETAILED DESCRIPTION OF THE INVENTION

Figure 1:
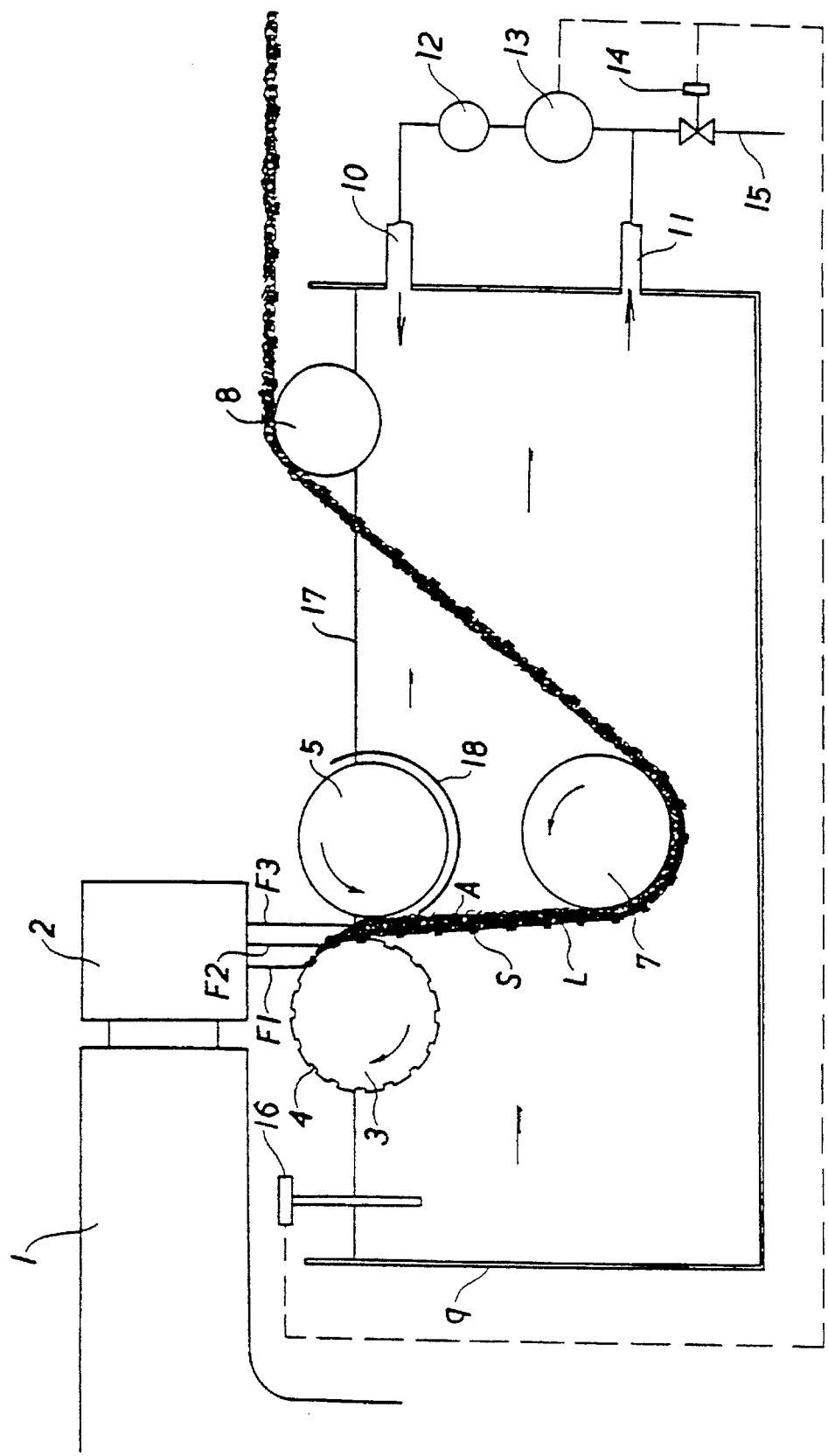
FIG. 1 is a structural schematic view of a manufacturing machine for a door mat.

In FIG. 1, reference numeral 1 denotes an extruder that extrudes fused soft vinyl chloride resin and a spinning pack 2 is connected to its outlet, and nozzles (not shown) are arranged in three rows on the lower part of the spinning pack 2, and rows of filaments F1–F3 are spun downwardly from these nozzles.

The rows of these monofilaments are such that filaments F1 form the anti-slip layer S of the door mat, filaments F2 form the reverse layer L of the door mat, and the filaments F3 form the surface layer A of the door mat.

Figure 2:
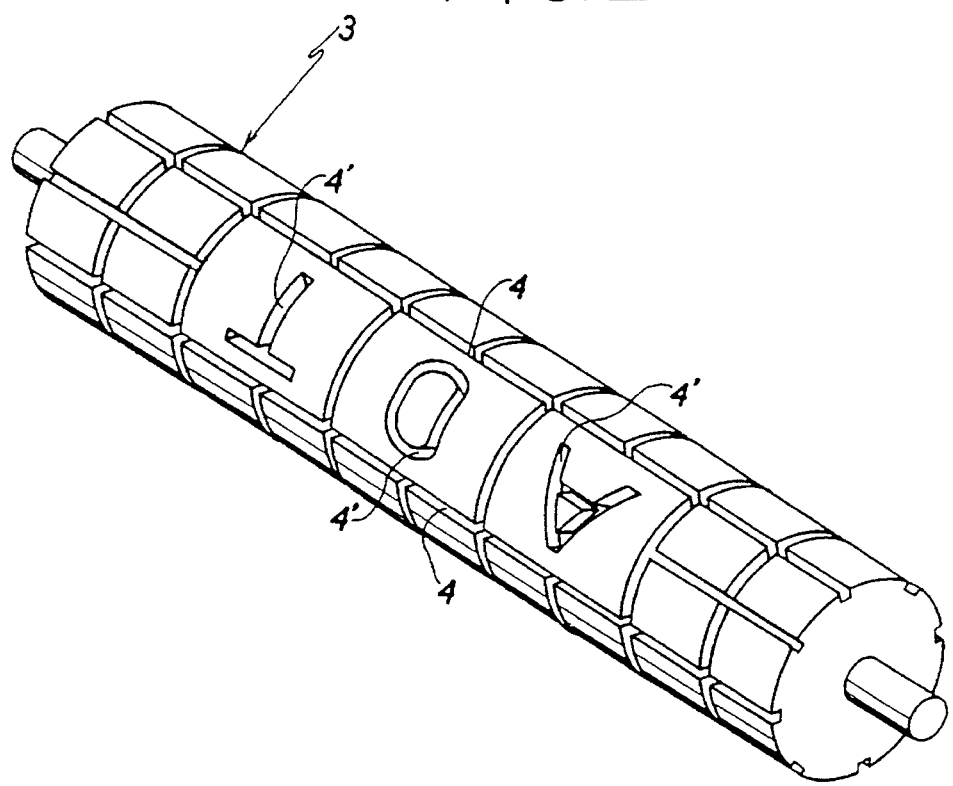
FIG. 2 is a perspective view of a molding roll in which a pattern of concave groove 6 is provided on its peripheral surface.

Reference numeral 3 denotes a molding roll formed by providing concave grooves 4 of the lattice type or concave grooves 4' in the form of letters or the like on its peripheral surface as is shown in FIG. 2. Roll 3 is disposed beneath the spinning pack 2 and rotates in the arrow direction.

Figure 3:
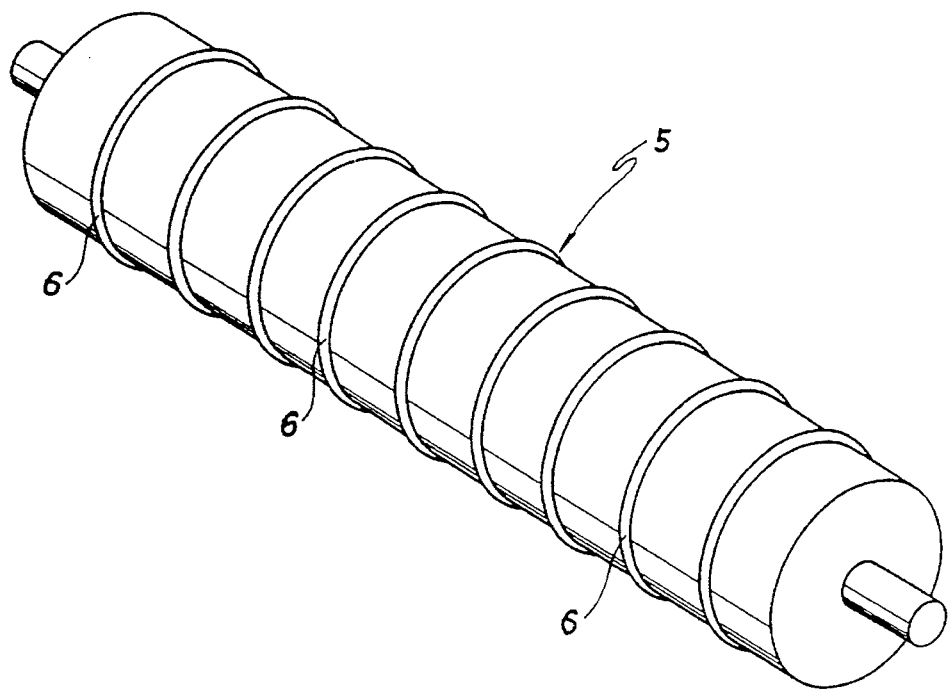
FIG. 3 is a perspective view of a pattern forming roll in which a pattern of convex stripes is provided on its peripheral surface.

Reference numeral 5 denotes a pattern forming roll disposed in opposition to the molding roll 3, as is shown in FIG. 1, which rotates in the arrow direction and is provided with projecting stripes 6 on its peripheral surface as shown in FIG. 3. This pattern forming roll 5 is constructed so that the distance with respect to the molding roll 3 can be adjusted according to the projecting stripes 6.

Reference numeral 7 denotes a guide roll for the door mat that is fed from the molding roll 3 and the pattern forming roll 5, being positioned to move the doer mat in a perpendicular direction. It rotates in the arrow direction as shown in FIG. 1. Reference numeral 8 denotes a feeding roll.

Reference numeral 9 denotes a cooling water tank that accommodates the pattern forming roll 5 and the guide roll 7, and the cooling water is kept at a fixed temperature (50°–60° C.). The temperature of the cooling water is set to a temperature that gradually cools the monofilaments F1–F3 so that the monofilaments are formed into loop groups. Also, an outflow pipe 11 communicating with the inside is provided on the lower part of one side wall of the cooling water tank 9, and an inflow pipe 10 is similarly provided on the upper part thereof. These pipes 10 and 11 are connected by means of a circulation pump 12 and a water heater 13, and a water supply pipe 15 provided with a cold water supply valve 14 connected to the water heater 13.

Reference numeral 16 denotes a water temperature adjusting meter disposed on one side of the cooling water tank 9 by a detecting unit having its lower end immersed in the water, and being connected to the water heater 13 and the cooling water supply valve 14 electrically. For example, when the temperature of the cooling water becomes lower than a predetermined temperature, a signal is transmitted to the water heater 13 from the water temperature adjusting meter 16. The water heater 13 then generates heat and at the same time operates the circulation pump 12 to suck the water in the cooling water tank 9 from the inflow pipe 11 and is made to pass through the water heater 13. The water heated to a predetermined temperature is made to outflow form the outflow pipe 10. However, in this case, the cold water supply valve 14 is closed.

Also, when the temperature of the cooling water becomes higher than a predetermined temperature, a signal is transmitted to the cold water supply valve 14 from the water temperature adjusting meter 16. The cold water supply valve 14 is then released, and at the same time operates the circulation pump 12 so that the cold water fed from the water supply pipe 15 is made to outflow from the outflow pipe 10. In this case, the heat source of the water heater 13 is turned off. As described above, the temperature of the water in the cooling water tank 9 is almost always kept constant. In this way, the water surface 17 of the cooling water is adjusted to be a predetermined level beneath the nozzle surface.

Furthermore, a convection restraint cover 18 is provided along a portion of the peripheral surface of the pattern forming roll 5 to cover the portion extending from the submerged cooling water to a portion that is slightly higher than the water surface 17. This convection restraint cover 18 prevents the temperature of the pattern forming roll 5 from rapidly cooling.

Among the rows of monofilaments to be fed from the spinning pack 2, the F1 row reaches the surface of the molding roll 3 first and forms a layer of loops L1 of the small ring type that accumulate in the concave grooves 4 or the concave grooves 4' provided on the peripheral surface of the molding roll 3, with the loops fusing at the intersections. There is thus formed an anti-slip layer S of lattice shape by virtue of the rotation of the molding roll 3.

A row of monofilaments F2 then deposits over the entire surface of the molding roll 3, including over the anti-slip layer S to thus form the loop layer L2, (see FIG. 5) and the intersection of the loop layer L2 and the loop layer L1 of the anti-slip layer S are fused together, and the intersection of each loop layer L2 composed of monofilaments F2 is fused together to form a reverse layer L that is deposited on the water surface 17.

On the other hand, a loop layer L3 lattice is formed whose lattice is larger than those of the loop layers L1 and L2 formed by the rows of the monofilaments F1 and F2 and this loop layer L3 deposits over the reverse surface layer L, and the surface layer A of the door mat is formed by fusing at the mutual intersections, and the outer surface of the surface layer A is deformed by the pattern forming roll 5 into a pattern D by the projecting stripes 6 provided on the peripheral surface of the pattern forming roll 5.

Figure 4:
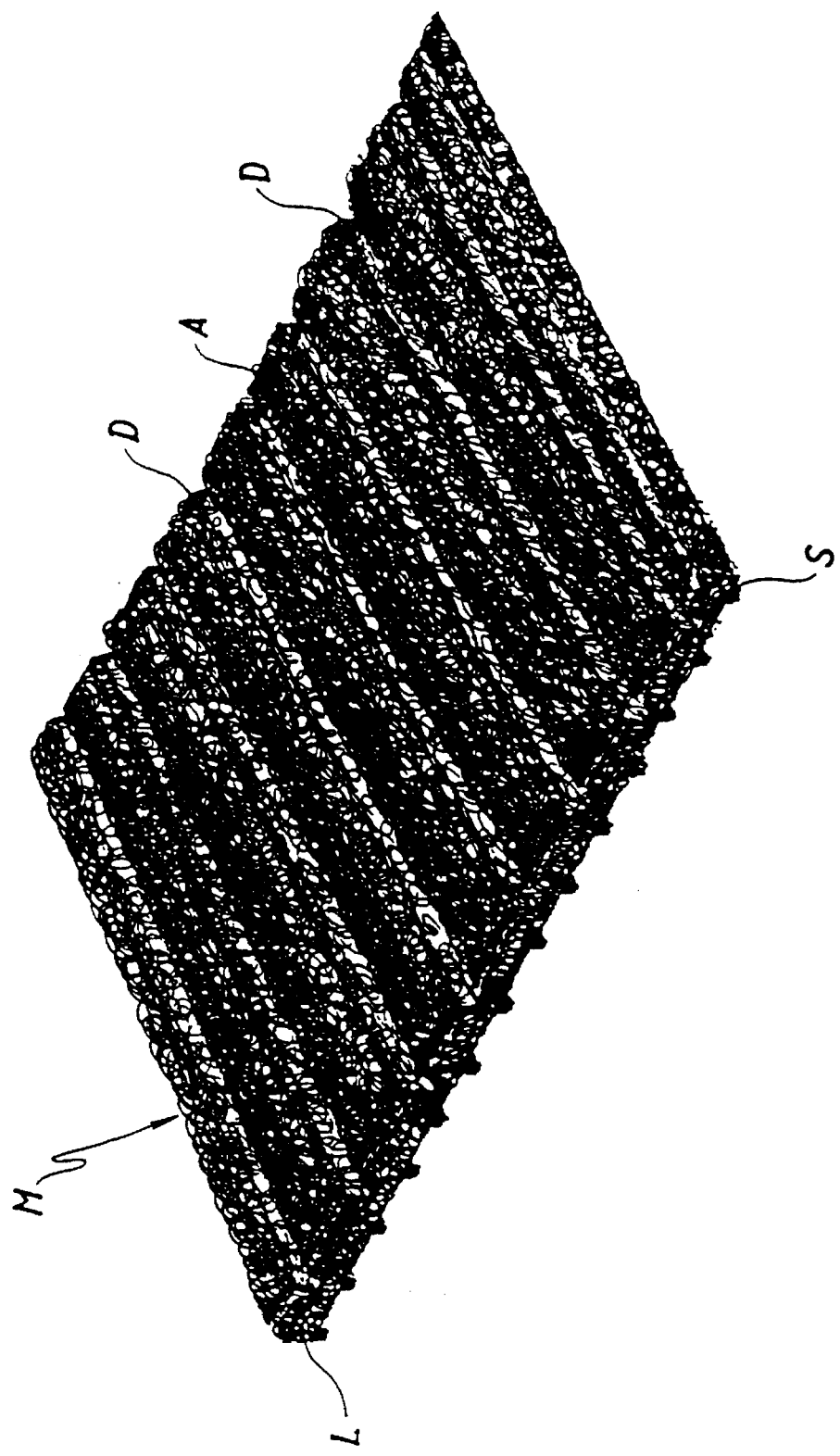
FIG. 4 is a perspective view of a door mat in which an anti-slip layer and a surface layer with a pattern are provided.
Figure 5:
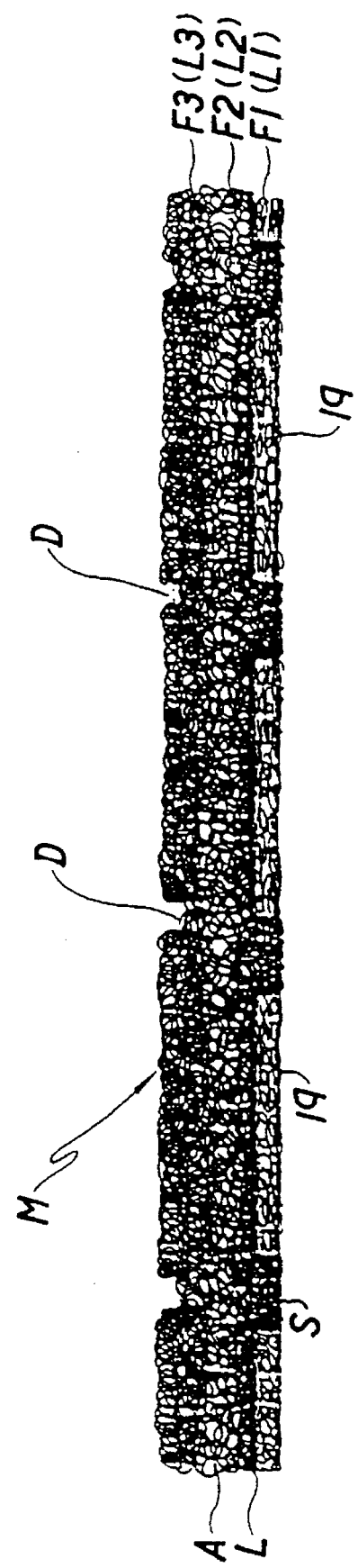
FIG. 5 is a side view in which part of the door mat of FIG. 4 is enlarged.
Figure 6:
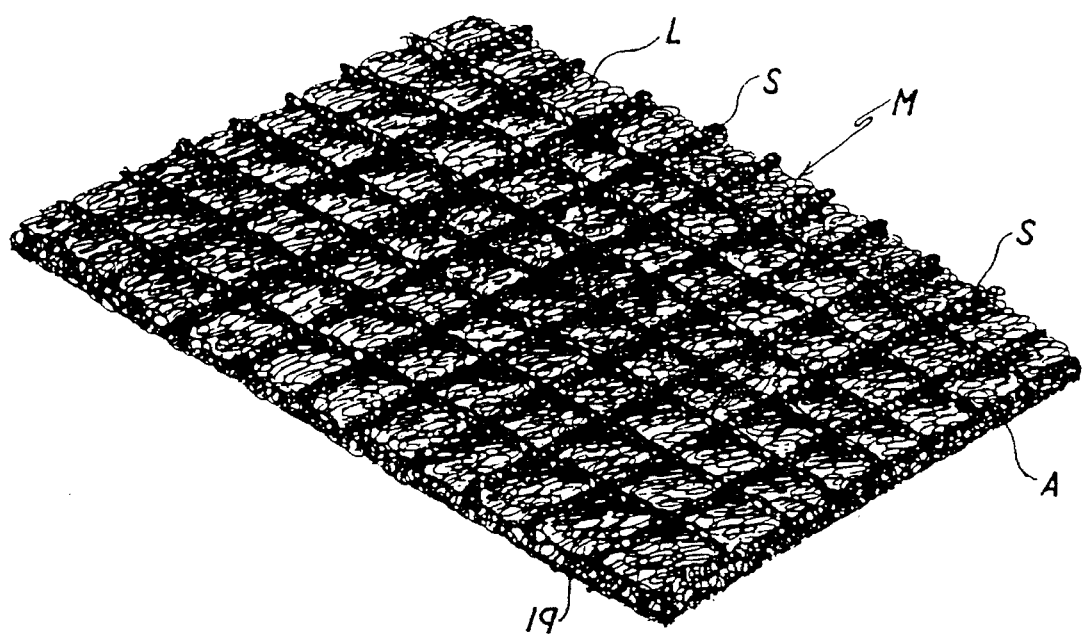
FIG. 6 is a perspective view of the reverse surface of the door mat of FIG. 4.

The door mat is transferred directly down into the water, and the loops L3 of the surface layer A are gradually cooled in the water and stabilized to become a three dimensional complex structure, so that a door mat M of the shape shown in FIGS. 4 through 6 can be produced.

As shown in these drawings, the size of the loop layers L1–L3 to be formed by the rows of filaments F1–F3 is such that the loop diameter becomes smaller in proportion to the perpendicular distance to the molding roll 3, and accordingly, the loop diameter L1 of the anti-slip layer S is a minimum, and the reverse surface layer L forms loop diameters L larger than that of the anti-slip layer S. Furthermore, the distance that the monofilaments F3 drop to the water surface 17 is the longest, and thus, the maximum loop diameter is formed.

Door mats of different structure can be produced by merely changing the mounting height of the molding roll 3 or the level of the water surface 17, which in turn changes the size or the shape of the loop diameters L1–L3 or easily changes rising angle of the loop L3 of the surface layer A.

Figure 7:
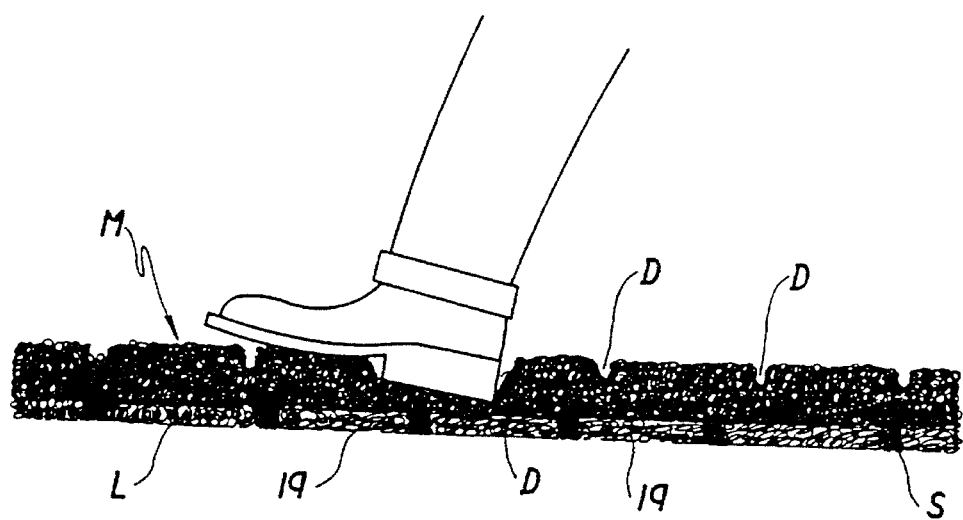
FIG. 7 is a cross-sectional view showing the condition of the door mat of FIG. 4 in use.

The door mat M produces a novel beauty since the surface layer A forms a three dimensional shape as shown in FIG. 4, and has a decoration pattern D of concavo-convex design on its surface. Also, the non-skid properties are increased as shown in FIG. 7 due to the formation of the concavo-convex pattern, and the concave pattern portion collects a large amount of mud and increases the mud removing function. Furthermore, since spaces 19 are formed between the reverse layer L and the spaced apart portion of the anti-slip layer S, the mud collecting properties are excellent as well as favorable cushioning properties. The collected mud passes downwardly through the reverse layer L into the inside of the anti-slip layer and the spaces within the lattice shape, and also the mud is thus not scattered outside the perimeter of the door mat since the mud is held due to the structure of the lattice, and as a result, the door mat keeps the surroundings clean.

The molding roll 3 and the pattern forming roll 5 are exchangeably provided in the cooling water tank 9, and the optional rolls may be chosen and exchanged with the rolls 3 and 5 having a variety of design patterns, whereby a door mat having a variety of design patterns an be obtained.

Figure 8:
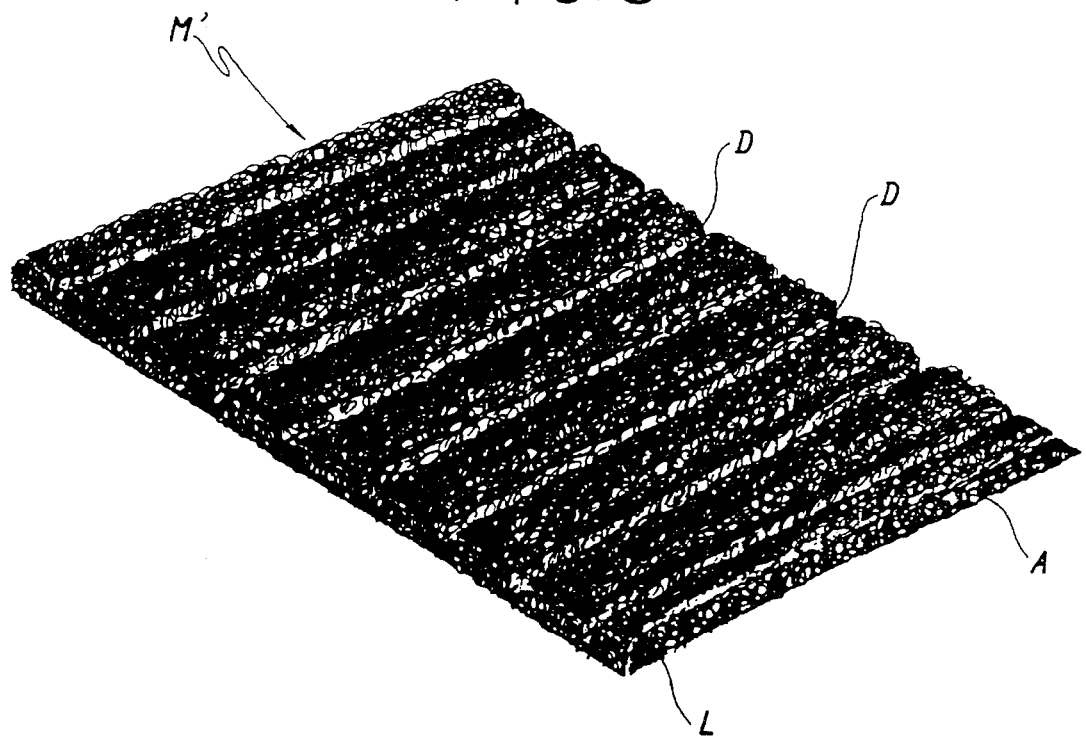
FIG. 8 is a perspective view of a door mat in which its peripheral surface is formed by using a flat molding roll, so that the reverse surface of the door mat becomes flat and a pattern is formed only on the surface layer of the door mat.
Figure 9:
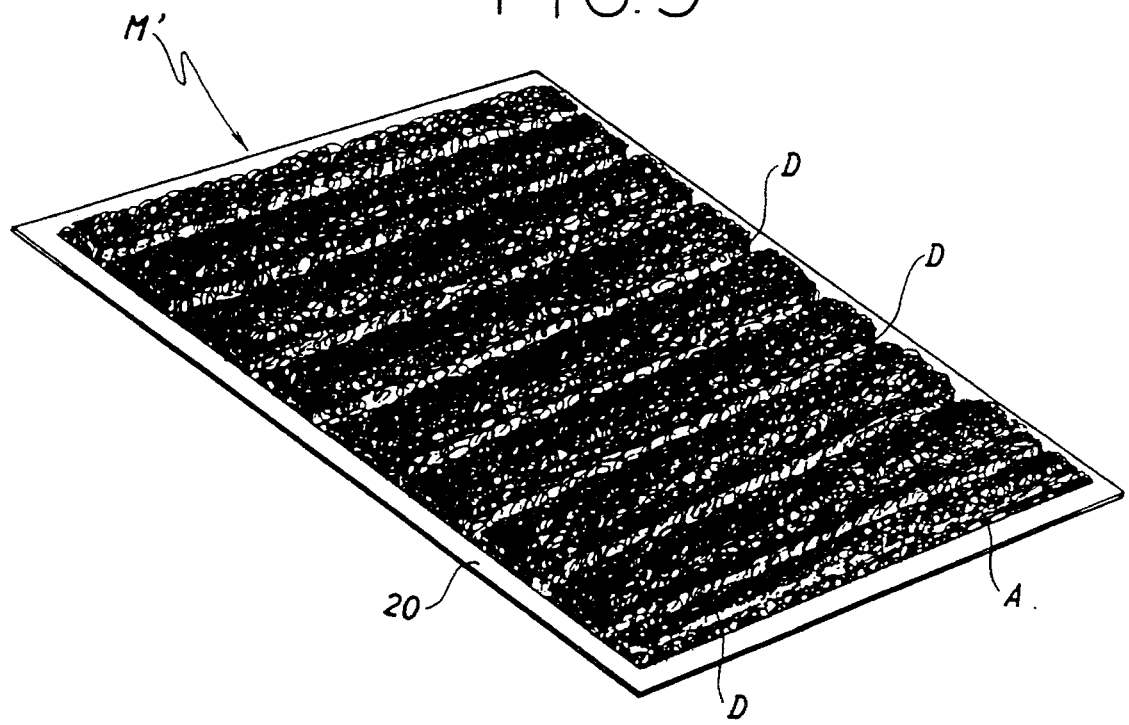
FIG. 9 is a perspective view of a complete door mat by providing a hemming on the peripheral edges of the door mat of FIG. 8.

Also, in order to produce a door mat without an anti-slip layer, the molding roll 3 having the concave grooves 4 on its peripheral surface as shown in FIG. 2 is replaced with a molding roll (not shown) which is flat on its peripheral surface. The door mat M' as shown in FIG. 8 can be produced in which a decoration pattern D is formed on only the surface layer A, and the reverse surface layer does not have the anti-slip layer S. FIG. 9 shows a door mat completed by hemming the peripheral edge of the door mat M' that is shown in FIG. 8.

Furthermore, in the case of producing a mat (not shown) in which an anti-slip layer S is provided, and a decoration pattern D is not provided on the surface layer A, the molding roll 3 having the concave groove 4 on its peripheral surface shown in FIG. 2 is used, and in lieu of the pattern forming roll S, a pressing roll (not shown) whose peripheral surface is flat is used. This pressing roll functions so that it applies the pressure to the loop group on the molding roll 3 and the anti-slip layer S is efficiently formed.

The door mat of this invention provides a softness and elasticity by the interval between the loop group of the surface layer and the reverse surface layer and the anti-slip layer, which gives a comfortable feeling to the user when walking, and yet, collects mud. Moreover, the surface layer, reverse surface layer and the anti-slip layer are integrally formed whereby a good slip effect of the durable type is attained.

The door mat according to this invention provides a novel decorative beauty by the decorative pattern formed on the loop groups of the surface layer.

The mud removed drops from the gaps of the loop groups in the surface layer and in the reversal layer of the door mat and is collected without being scattered outside of the anti-slip layer forming the lattice, whereby the mud can be simply removed by turning up the door mat, providing an efficiency in workability of the cleaning.

Accordingly, the door mat according to this invention is excellent to collect mud and on account of a compound structure of the surface layer, reverse surface layer and anti-slip layer, in which the size and/or the shape of the loops constituting the monofilaments is different, making the mud stay in the anti-slip layer forming the lattice without scattering outside, and as a result, keeping the surroundings clean. Moreover, the retained mud can be easily removed by turning up the door mat, and the mud adhered to the door mat can be easily removed by beating or simply washing it with water whereby it can be used in a clean condition.

Moreover, the door mat according to this invention increases the mud removing function and safety by the decorative pattern formed on the loop group of the surface layer. Yet, the decorative beauty that cannot be found in the conventional door mat can be brought about, and when used at the entrance of a building that attracts the eyes of people, an additional value that is both beauty and practical value can be demonstrated.

Furthermore, the surface layer, reverse surface layer and the anti-slip layer can be integrally and continuously formed whereby the productivity is high and the cost of production is low, and the door mat is of an integral structure which is superior in the strength, which prevents slippage, and can be used with a safety for a long period of time.

The cushion property of the door mat according to this invention is excellent since spaces are between the reverse surface of the door mat and the anti-slip layer.

By selecting the molding roll, the anti-slip layer may be provided on the reverse surface of the door mat or may not be provided so that the structure of the surface layer and the reverse surface layer can be chosen according to the location where the door mat is to be used.

These door mats can be produced efficiently, are of the integral structure and their strength is excellent.

What is claimed:

1. A method of manufacturing a door mat, comprising extruding monofilaments from a plurality of nozzles contained in a spinning pack connected with an extruder, receiving in loop form a first portion of the monofilaments on a concave groove provided on a peripheral surface of a rotating molding roll to form an anti-slip layer of a doormat, the rotating molding roll being located under the spinning pack and a portion of the rotating molding roll being arranged in a cooling water tank, receiving in loop form a second portion of the monofilaments on the anti-slip layer and on a nongrooved portion of the peripheral surface of the rotating molding roll to form a reverse surface layer of the doormat on the anti-slip layer and on the nongrooved portion of the peripheral surface of the rotating molding roll, receiving in loop form a third portion of the monofilaments on the reverse surface layer arranged at the cooling water surface and at a position lower than the surface of the rotating molding roll to form a surface layer of the doormat, forming a decorative pattern on the surface layer of the doormat by contacting the surface layer of the doormat with a pattern forming roll arranged opposite the rotating molding roll in the cooling water tank and provided with a convection restraint cover, and fusing the loops at their intersections to form an integral doormat.

2. A method as defined by claim 1, wherein the rotating molding roll has a pattern of concave grooves on its peripheral surface.

3. A method as defined by claim 1, wherein the pattern forming roll has a pattern of convex stripes on its peripheral surface.

4. A method as defined by claim 1, wherein the loops of the anti-slip layer are formed to be of a smaller diameter than the loops of the reverse layer, and the loops of the reverse layer are formed to be of a smaller diameter than the loops of the surface layer.

\* \* \* \* \*